United States Patent
Banaei (10) Patent No.: US 11,906,765 B2
(45) Date of Patent: Feb. 20, 2024

(54) ULTRA-THIN THIN-FILM OPTICAL INTERFERENCE FILTERS

(71) Applicant: Everix, Inc., Orlando, FL (US)

(72) Inventor: Esmaeil Banaei, Orlando, FL (US)

(*) Notice: Subject to any disclaimer, the term of this patent is extended or adjusted under 35 U.S.C. 154(b) by 786 days.

(21) Appl. No.: 16/634,505

(22) PCT Filed: Aug. 7, 2018

(86) PCT No.: PCT/US2018/045489
§ 371 (c)(1),
(2) Date: Jan. 27, 2020

(87) PCT Pub. No.: WO2019/032499
PCT Pub. Date: Feb. 14, 2019

(65) Prior Publication Data
US 2020/0233131 A1    Jul. 23, 2020

Related U.S. Application Data (60) Provisional application No. 62/541,937, filed on Aug. 7, 2017.

(51) Int. Cl.
*G02B 5/28* (2006.01)
*G02B 1/115* (2015.01)

(52) U.S. Cl.
CPC .............. *G02B 5/285* (2013.01); *G02B 1/115* (2013.01)

(58) Field of Classification Search
CPC ......... G02B 1/111; G02B 1/113; G02B 1/115; G02B 5/285–289
See application file for complete search history.

(56) References Cited

U.S. PATENT DOCUMENTS

| | | |
|---|---|---|
| 4,373,782 A | 2/1983 | Thelen |
| 4,463,047 A | 7/1984 | Matteucci et al. |
| | (Continued) | |

FOREIGN PATENT DOCUMENTS

| | | |
|---|---|---|
| JP | 2004507781 | 3/2004 |
| JP | 2013511746 | 4/2013 |
| | (Continued) | |

OTHER PUBLICATIONS

International Search Report for International Application No. PCT/US2018/045489, dated Oct. 22, 2018, 2 pgs.

(Continued)

*Primary Examiner* — Kimberly N. Kakalec
(74) *Attorney, Agent, or Firm* — A. Robert Weaver; The Brickell IP Group, PLLC (57) ABSTRACT

A thin-film interference filter has a thin-film interference multi-layer stack composed of individual thin-film layers arranged in groups to form a plurality of repeat unit blocks. The thin-film interference filter is flexible enough to be bendable to a radius of curvature of 250 mm or even less without permanently damaging the thin-film interference filter. The thin-film interference filter may have a second thin-film interference multi-layer stack composed of individual thin-film layers arranged in repeat unit blocks may have a different optical transmission spectrum. At least one interlayer between the first thin-film interference multi-layer stack and the second thin-film interference multi-layer stack may block a range of wavelengths of infrared, visible, or ultraviolet light. A defect layer of a different optical thickness than neighboring thin-film layers forming the repeat unit blocks, thereby creating a Fabry Perot resonance cavity.

22 Claims, 5 Drawing Sheets

(56) References Cited

U.S. PATENT DOCUMENTS

| | | | |
|---|---|---|---|
| 6,531,230 B1 * | 3/2003 | Weber | B32B 27/08 |
| | | | 428/580 |
| 7,901,870 B1 | 3/2011 | Wach | |
| 2002/0186474 A1 | 12/2002 | Weber et al. | |
| 2004/0025232 A1 | 2/2004 | Hartley et al. | |
| 2004/0033675 A1 | 2/2004 | Fleming et al. | |
| 2005/0233123 A1 * | 10/2005 | Weber | G02B 1/111 |
| | | | 428/447 |
| 2009/0109537 A1 | 4/2009 | Bright et al. | |
| 2010/0316852 A1 | 12/2010 | Condo et al. | |
| 2011/0261464 A1 | 10/2011 | Hoffman et al. | |
| 2012/0229893 A1 | 9/2012 | Hebrink et al. | |
| 2014/0242329 A1 | 8/2014 | Banaei | |
| 2015/0002809 A1 | 1/2015 | Cohen-Tannoudji et al. | |
| 2015/0146166 A1 | 5/2015 | Weber et al. | |
| 2016/0039155 A1 | 2/2016 | Ito et al. | |
| 2016/0062009 A1 | 3/2016 | Wach | |
| 2016/0109628 A1 * | 4/2016 | Weber | G02B 27/141 |
| | | | 359/359 |
| 2016/0141156 A1 | 5/2016 | Watanabe et al. | |
| 2016/0158886 A1 | 6/2016 | Kumar et al. | |
| 2018/0067234 A1 * | 3/2018 | Fujimoto | C09D 7/40 |

FOREIGN PATENT DOCUMENTS

| | | | | |
|---|---|---|---|---|
| JP | 2015507758 | | 3/2015 | |
| JP | 2016538597 | | 12/2016 | |
| WO | 2014208745 A1 | | 12/2014 | |
| WO | WO2014/199872 A1 | | 12/2014 | |
| WO | WO-2016147733 A1 * | | 9/2016 | B32B 27/20 |
| WO | 2017046742 A1 | | 3/2017 | |
| WO | WO2017/046742 A1 | | 3/2017 | |
| WO | WO2017/077359 A1 | | 5/2017 | |

OTHER PUBLICATIONS

Chinese Patent Office, Office Action in Chinese Application No. 201880061615.1 dated Mar. 31, 2022.
Office Action dated Sep. 20, 2022 by Japanese Patent Office.
Translation of Office Action dated Sep. 20, 2022 by Japanese Patent Office.

* cited by examiner

ULTRA-THIN THIN-FILM OPTICAL INTERFERENCE FILTERS

CROSS REFERENCE TO RELATED APPLICATIONS

This application is a U.S. National Phase under 35 U.S.C. § 371 of PCT International Application No. PCT/US2018/045489, filed Aug. 7, 2018, which in turn claims the benefit of priority under 35 U.S.C. § 119 to U.S. Provisional Application No. 62/541,937, filed Aug. 7, 2017, the contents of which are incorporated herein by reference in their entirety.

TECHNICAL FIELD

The present application relates to optical interference filters, in particular multilayer thin-film filters.

BACKGROUND

Optical interference filters are inherently complicated and expensive to produce because of the complex layer structures required to obtain high optical density (O.D.) while maintaining a high degree of spectral selectivity. The ability to fine tune the spectral shape of the filtered light is one of the advantages of interference filters.

Traditionally, such interference filters are made through vacuum deposition of transparent thin-film optical layers on a substrate of plastic or glass. The substrates, on which the thin-film layers are deposited, are typically in the thickness range 0.5 to 10 mm. Layer-by-layer coating and subsequent filter cutting induce tensions in the thin-film stack that often causes bending and cracking on the thin-film filter, especially if the substrate is too thin. This issue is more significant for filters with a large number of layers in order to achieve high optical performance. For obtaining a high optical density a large number of layers is required. Wide spectral ranges of blocking would require large numbers of layers. Sharp transition edges between high and low transmission level often require complex layer structures with a large number of layers with various refractive indices. Similarly, suppressing side reflection bands in order to create flat transmission curves often requires complex layer structures and large numbers of layers with various refractive indices.

Thin, plastic-based filter films have been previously made mainly through three approaches:

1. Co-extrusion: In this approach, two or more materials typically flow through a feed-block and form a few-layer stack of material. This few-layer flow of material is then forced through a series of layer multipliers where the original layered stack is split in a direction in various ways and recombined in a perpendicular direction in order to double the number of layers while changing the width or height of the stack. The final multi-layer flow is then forced through a die to spread the multi-layer stack into a multi-layer film. This approach has certain limitations. A) the multi-layer films are limited to periodically repeated unit blocks of layers. In other words, the same few-layer stack that exits the feed-block is multiplied periodically. At best, the multipliers may have varying splitting and recombining ratios such that the thickness ratios change from one multiplier to the next. Customization of individual layers is not feasible. B) This approach only works for all-plastic filters that can be processed in co-extrusion equipment. For example, glass layers cannot be introduced.

2. Coating on flexible substrates: The web coating process is widely used in window film industry where rolls of plastic films are fed into vacuum chambers to deposit thin-film layers. There are often multiple deposition sources in a series such that each deposition source deposits one layer at a time. This method is often used for simple layer structures for only a few layers of anti-reflective, scratch protective or heat rejection layers with as many as 20 coating layers. Given the brutality of the coating source materials for thin-film layers, larger numbers of layer will cause cracking of the thin-film stack as the flexible substrate bends. For that reason, complex thin-film filters cannot be built on flexible substrates with this approach. A similar approach includes mounting sheets of flexible substrates on a drum or a fixture inside a closed vacuum chamber. This approach yields much smaller quantities of products, but allow for somewhat more complex filters with more number of layers built. Despite the brittle nature of the layers and limited bending capabilities, these products have limited applications. These two approaches for growing multi-layer filters on flexible substrates are also used for creating small-size particles of multi-layer filters by intentionally cracking the multi-layer filter layers once they are grown on a flexible substrate. Flexible substrate makes it easier to create particles from such filters.

3. Nano-lamination: In this approach, nano-scale layers of materials with various refractive indices are laminated directly on a flexible substrate in a roll-to-roll manner. The major drawback of this method and the resulting products is the lack of uniformity and controllability of individual sub-layers at sub-micron scale. Therefore, the resulting filter products do not perform well as highly selective filters.

US Patent Publication US 2014/0242329 A1 describes a method of producing thin-film optical filters using thermal drawing of structured preform blocks. This method allows for production of thin film optical interference filters in the form of all-plastic flexible ultra-thin films and sheets. This method addresses two major drawbacks of the traditional vacuum coated thin film filters by providing significantly higher scalability and providing ultra-thin filters that can bend and conform to curved surfaces while demonstrating high performance. The disclosure of US 2014/0242329 A1 is herewith incorporated by reference in its entirety with respect to the method of thermal drawing of thin-film filters.

SUMMARY

The present disclosure introduces a thin-film interference filter having a first thin-film interference multi-layer stack composed of individual thin-film layers arranged in groups to form a plurality of first repeat unit blocks, wherein the thin-film interference filter is flexible enough to be bendable to a radius of curvature of 250 mm or even smaller, without permanently damaging, deforming or cracking the thin-film interference filter as a whole, or the thin-film layers in the at least one multi-layer stack.

A second thin-film interference multi-layer stack composed of individual thin-film layers arranged in groups to form a plurality of second repeat unit blocks may have a different optical transmission spectrum than the first thin-film interference multi-layer stack.

At least one interlayer between the first thin-film interference multi-layer stack and the second thin-film interference multi-layer stack having a thickness, which is 10-1000 times thicker than that of each individual thin-film layer in the first thin-film interference multi-layer stack. The interlayer may be an absorptive layer to block a range of wavelengths of infrared, visible, or ultraviolet light for effective absorption of selective wavelengths.

Jacket layers, between which the thin-film interference multi-layer stack or stacks are arranged, may be provided for physical protection of the thin-film interference multi-layer stack or stacks.

Additionally, 1 to 15 layers of anti-reflective thin-film layers on an outside surface of at least one of the first jacket layer or the second jacket layer improves the optical properties of the filter. The anti-reflective thin-film layers may be polymeric or glass-based and may be produced by co-drawing with the first jacket layer and the first thin-film interference multi-layer stack in a thermal drawing process. Alternatively, at least some of the anti-reflective thin-film layers may be produced by coating first jacket layer after the thermal drawing process.

For effective protection, the first jacket layer and the second jacket layer have a thickness of 10-1000 times thicker than each individual thin-film layer in the first thin-film interference multi-layer stack. At least one of the first jacket layer or the second jacket layer may have a dual function by also being an absorptive layer blocking a range of wavelengths of infrared, visible, or ultraviolet light.

Each individual thin-film layer in the first multi-layer stack has a thickness in the range of 5 nm to 5,000 nm, and the thin-film interference filter may have a total thickness within the range 0.01 mm to 1 mm.

The thin-film interference filter has a transmission spectrum varying between a low transmission of at most 20% of incident light of a first wavelength and a high transmission of at least 80% of incident light of a second wavelength. At least one transition edge between the low transmission and the high transmission has a width of at most 5% of a third wavelength between the first and the second wavelength, at which the thin-film interference filter transmits 50% of incident light.

Further details and benefits of the present application will become apparent from the following description of the accompanying drawings. The drawings are provided herewith solely for illustrative purposes and are not intended to limit the scope of the present invention.

DETAILED DESCRIPTION

Figure 1:
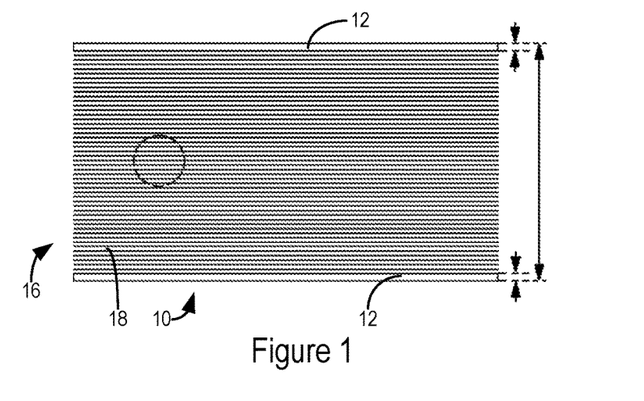
FIG. 1 shows a cross-section of a multilayer thin-film optical interference filter with two jacket layers.
Figure 2:
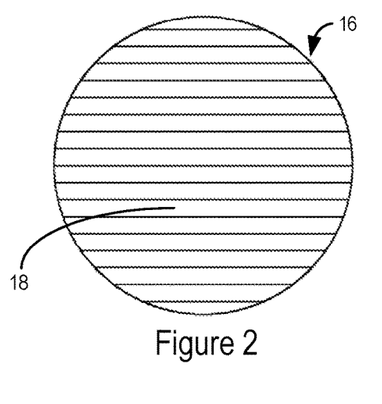
FIG. 2 shows a partial detail of FIG. 1.

Throughout the following description, the word "or" is used as an inclusive term, referencing one or the other, or both options, unless specified otherwise. Accordingly, individual features described, such as absorptive layers, defects, unit blocks, jacket layers varying refractive indices, varying layer thicknesses, etc., may be combined within a single multilayer thin-film optical interference filter. Some of the layers may be co-drawn through a furnace, other layers may be applied by coating within the same filter. The present disclosure introduces various filter types and layer structures with physical features and specifications related to their flexibility and optical performance:

In a first example shown in FIG. 1, a multilayer thin-film optical interference filter 10 includes two jacket layers 12 and, sandwiched between the jacket layers 12, a multilayer stack 16 composed of dozens of thin-film layers 18 that are shown in a partial detail view in FIG. 2. The jacket layers may be transparent over the entire range of wavelengths of infrared (IR), visible, and ultraviolet (UV) light, or at least across all wavelengths transmitted by the multilayer stack 16 so that the jacket layers 12 to not substantially affect the optical properties of the thin-film filter. Substantially as used in the present application means within a range of 10%. Alternatively, one or both of the jacket layers 12 may constitute absorptive layers blocking one or more ranges of wavelengths that would otherwise be transmitted by the multilayer stack 16. In this application, unless indicated otherwise, the term blocking involves a transmission of less than 50% of the incident light energy, while absorbing more than 50% of the incident light energy. Each jacket layer 12, respectively, has a thickness in the range of 10-1000 times thicker than each individual thin-film layer 18 in the multi-layer stack 16.

Figure 4:
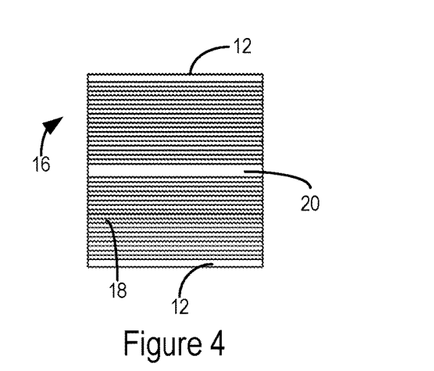
FIG. 4 shows a cross-section of a multilayer thin-film optical interference filter with two jacket layers and an intermediate layer disposed between two multilayer stacks.

In one general embodiment, the thin-film interference filter 10 includes a combination of thin-film interference multi layers 18 and absorptive or transparent interlayers 20 which are 10-1000 times thicker than individual thin-film layers in the multi-layer stacks 16, and this combination is surrounded from both sides with layers 12 of jacket materials each in the range 10-1000 times thicker than each individual thin-film layer in the multi-layer stack 16. The multilayer interference film of FIG. 4, for example, includes two multilayer stacks 16 bookended by two jacket layers. Between the two multilayer stacks 16, a further layer 20 is disposed that is thicker than the thickness of each individual thin-film layer 18 of the multilayer stacks 16. This thicker layer 20 may be an absorptive layer or a transparent layer.

The layers 18 in the multi-layer stacks 16 are in the thickness range of 5 nm to 5,000 nm, depending on the target wavelengths for filtering, the material's refractive index and optical performance of the filter that depends on layer structures and thickness distributions among layers to meet the conditions for destructive interference or constructive interference. The total thickness of the filter film 10 including the protective jacket layers 12 on both sides and, where present, any intermediate layers 20 is in the range 0.05 mm to 1 mm.

The filter film 10 is flexible such that it can be bent to a radius of curvature in the range 3 mm to 250 mm depending on the filter thickness and constituent materials, without permanently damaging, deforming or cracking the filter 10 as a whole, or its thin-film layers 18 in the multi-layer stacks 16.

Figure 5:
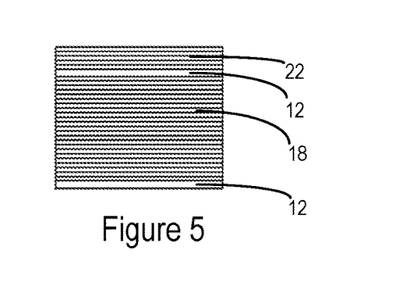
FIG. 5 shows a cross-section of a multilayer thin-film optical interference filter with two jacket layers and antireflective layers on one of the jacket layers.

The filter structure may also include up to 15 layers of anti-reflective thin-films 22 on the outside of either jacket layers 12 responsible for reducing reflectivity as indicated in FIG. 5. A multilayer stack 16 is sandwiched between two jacket layers 12. On the outside of one jacket layer 12, several antireflective layers 22 are present to enhance the transmission of light. These anti-reflective layers 22 may be polymeric or glass-based, produced with the thermal drawing process, or coated on the filter films after filter subassemblies including all other layers 18, and optionally 12 or 22 are produced.

General Optical Performance of the Filter Devices

The optical filters 10 described herein block parts of the spectral wavelength range between 300 nm and 25 microns for optical applications from UV across the visible light spectrum to the IR. Throughout this description, the terms "approximately" and "about" describe a deviation of up to ±15%, preferably ±5%.

Figure 6:
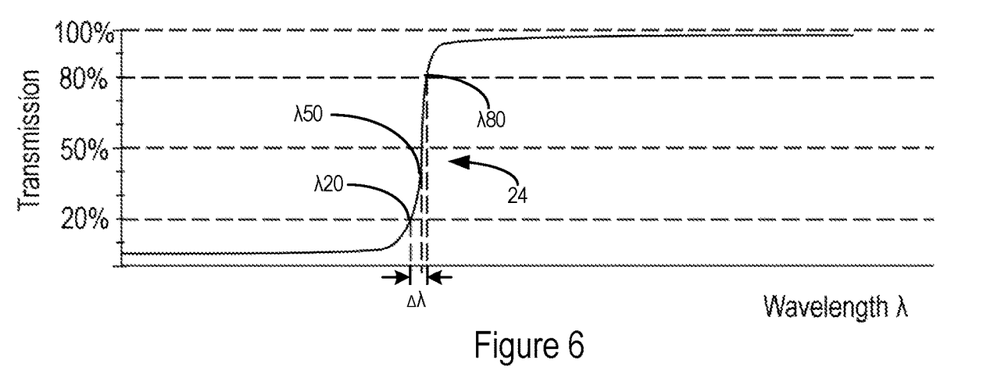
FIG. 6 shows a transmission spectrum with a transition edge from low transmission to high transmission.
Figure 12:
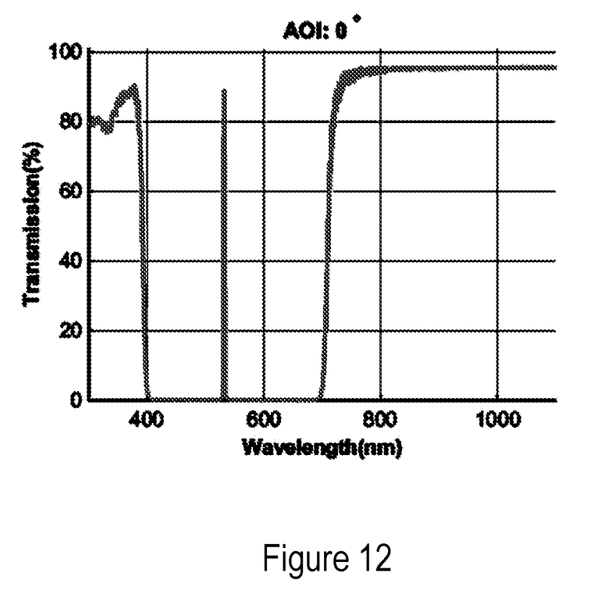
FIG. 12 shows a modeled transmission spectrum of a filter with a built-in defect layer.
Figure 13:
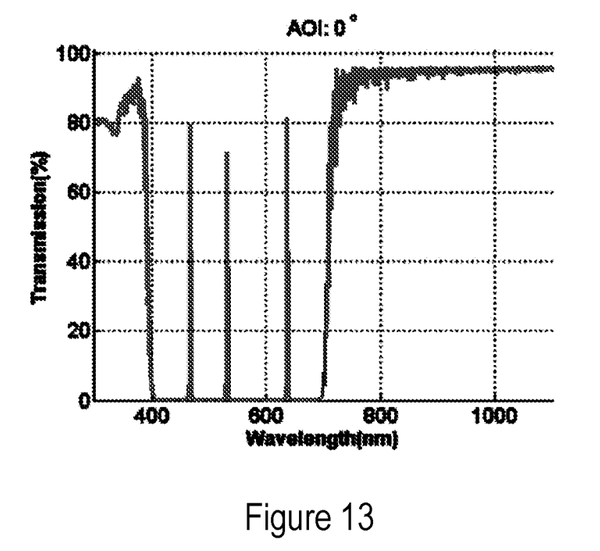
FIG. 13 shows a modeled transmission spectrum of a filter with several built-in defect layers.

The filters 10 have a transmission spectra with at least one transition edge between low and high transmission. For the purposes if this specific example, high transmission is defined as transmission more than 80% of the incident light. Low transmission is defined as transmission of at most 20% of the incident light. One example of a transition edge is shown in FIG. 6. FIG. 6 shows a transmission spectrum with a transition edge 24 from low transmission to high transmission with increasing wavelength $\lambda$. The edge slope of at least one such transition edge 24 between low and high transmission is in the range 0.02%-5%. This means that the difference $\Delta\lambda$ between the wavelength $\lambda 80$, at which the transmission reaches 80% closest to the high transmission range and the wavelength $\lambda 20$ at which the transmission reaches 20% closest to the low transmission range is in the range 0.02%-5% of the wavelength $\lambda 50$ at which the transmission equals 50% on the upward edge between the two points. The wavelength difference $\Delta\lambda$ for the transition edge is, for example, less than 0.05% of the 50% transmission wavelength $\lambda 50$ where a transmission band itself only has a width $\Delta\lambda$ of 0.1 nm (e.g. as depicted in FIGS. 12 and 13), while the transition edge may extend over several percent of the 50% transmission wavelength $\lambda 50$ for wider bands (as, for example shown in FIGS. 7, 10, and 11).

The transitional edge may be defined between different transmission levels than shown in this example, for example between 20% and 50% transmission, where the transmission in a bandpass, for example, does not reach a higher transmission level. In that case, the reference wavelength $\lambda 50$ is the wavelength at which the transmission equals 50% of the highest transmission level of the transitional edge.

While the transmission level may fluctuate, up to 94% transmission can be achieved for high-transmission wavelengths without anti-reflective layers on the filter surfaces, with ambient air having a refractive index of approximately 1. With additional anti-reflective layers, the transmission for high-transmission wavelengths may reach up to 99% under the same ambient conditions.

Figure 7:
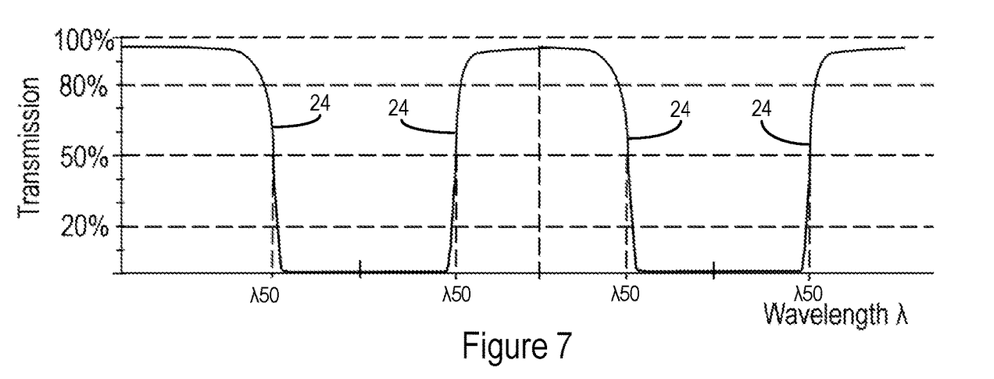
FIG. 7 shows a transmission spectrum with four transition edges forming two blocking bands.

The filter spectra may have up to 20 transition edges from high to low and from low to high transmission to provide multiple transmission and blocking ranges between adjacent transition edges. FIGS. 7 and 12, for example, show a total of four transition edges 24 with two blocking bands, and FIG. 13 shows a total of eight transition edges with four blocking bands, half of which are low-to-high transmission edges, and the other half of which are high-to-low transmission edges, respectively. The full width of a band at half maximum $\Lambda 50$ (FWHM) of each transmission band or blocking band can be in the range 0.1% to 75% of the center wavelength of the same band. The lower limit of 0.1% corresponds to very narrow notch or bandpass filters as will be described below for Fabry Perot resonance cavities with spectra shown in FIGS. 12 and 13, while the upper level corresponds to wide notch or bandpass filters. Further details about layer structures that provide such transmission curves are below.

The transmission in low-transmission ranges can reach as low as 0.1%, 0.01%, 0.001%, 0.0001%, or even 0.00001% by using a sufficient number of interference layers 18 or by adding an absorptive layer 20 or 12 blocking a range of wavelengths.

Various Layer Structures of the Filter Devices

Figure 3:
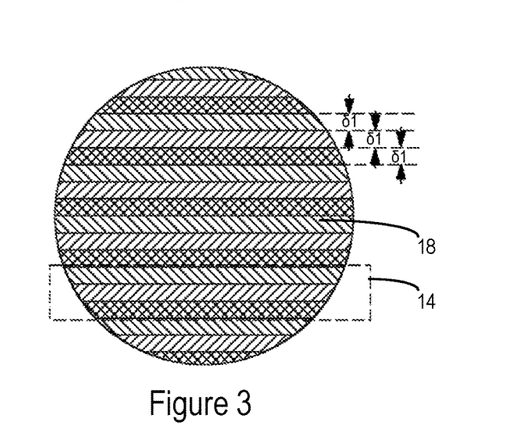
FIG. 3 shows a partial detail of a thin-film multi-layer stack composed of repeat unit blocks.
Figure 8:
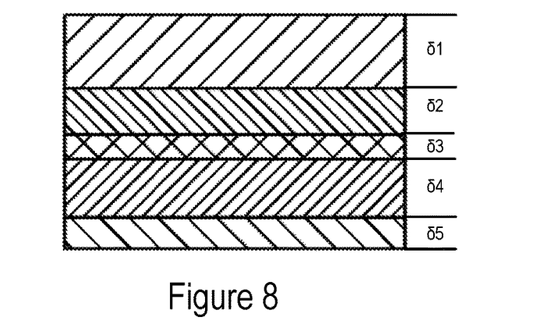
FIG. 8 shows a unit block of five different materials in five layers.

As schematically indicated in FIG. 3, the thin-film multi-layer stack 16 in the filter film can be composed of unit blocks 14 that repeat multiple times in the stack 16. Each unit block can be made of up to 12 sublayers of up to 5 different materials. Internal sub-layers of each repeat unit block may be in the thickness range 1% to 75% of the total physical thickness of the repeat unit block 14. FIG. 3 shows unit blocks 14 with three layers 18 of identical thickness $\delta 1$ and different materials with different refractive indices, resulting in equal or different optical path lengths or optical thicknesses. Alternatively, FIG. 8 shows a unit block of five different materials in five layers that also differ in their thicknesses $\delta 1$, $\delta 2$, $\delta 3$, $\delta 4$, and $\delta 5$.

Optical thicknesses of the internal sub-layers may vary up to 90% lower or higher than the average optical thickness of all layers 18 in the unit block 14 due to either refractive index or thickness differences between sub-layers. Optical thickness is defined as the product of physical thickness, such as $\delta 1$, $\delta 2$, $\delta 3$, $\delta 4$, and $\delta 5$, and optical refractive index of the material which may vary with wavelength.

For example, the optical thickness of individual unit blocks 14 may be varied in such small increments such the optical thicknesses or refractive index as a function of thickness (position) across the multi-layer stack may be approximated to follow a sinusoidal or generally periodic curve. This creates a quasi-rugate structure without having to provide a continuously changing refractive index of a rugate structure throughout the thickness of the multilayer stack 16. In the simplest form, only three different refractive indices can form a periodic refractive index function that is similar to a saw-tooth function as a discreet approximate to a sinusoidal function.

A filter film 10 can have as few as 5 repeat unit blocks 14 or as many as 1000 unit blocks 14, not all of which need to be identical. Unit blocks 14 can be arranged in various ways in the multi-layer stack 16 of the thin-film filter 10. In one embodiment, in a simple case, they can all have the same total thicknesses. In other embodiments illustrated in plots 101 through 106 in FIG. 9, the unit blocks 14 in a filter stack 16 may be identical in material and order of layers 18, except for a scaling factor on their total thicknesses. This variation may be in a linear fashion as shown in plot 101 or in a non-linear fashion as shown in plots 102 and 103, increasing from one end of a multi-layer stack 16 to the other end. In another embodiment, the scaling factor may decrease from a highest value on one end of the stack 16 to a lowest value and increase back to a higher value as schematically indicated in plot 104, or vice versa as schematically indicated in plot 105. There may be multiple cycles of linear or non-linear fluctuations in the scaling factor of the unit block thicknesses across the multi-layer stack 16 as schematically indicated in plot 106.

Figure 9:
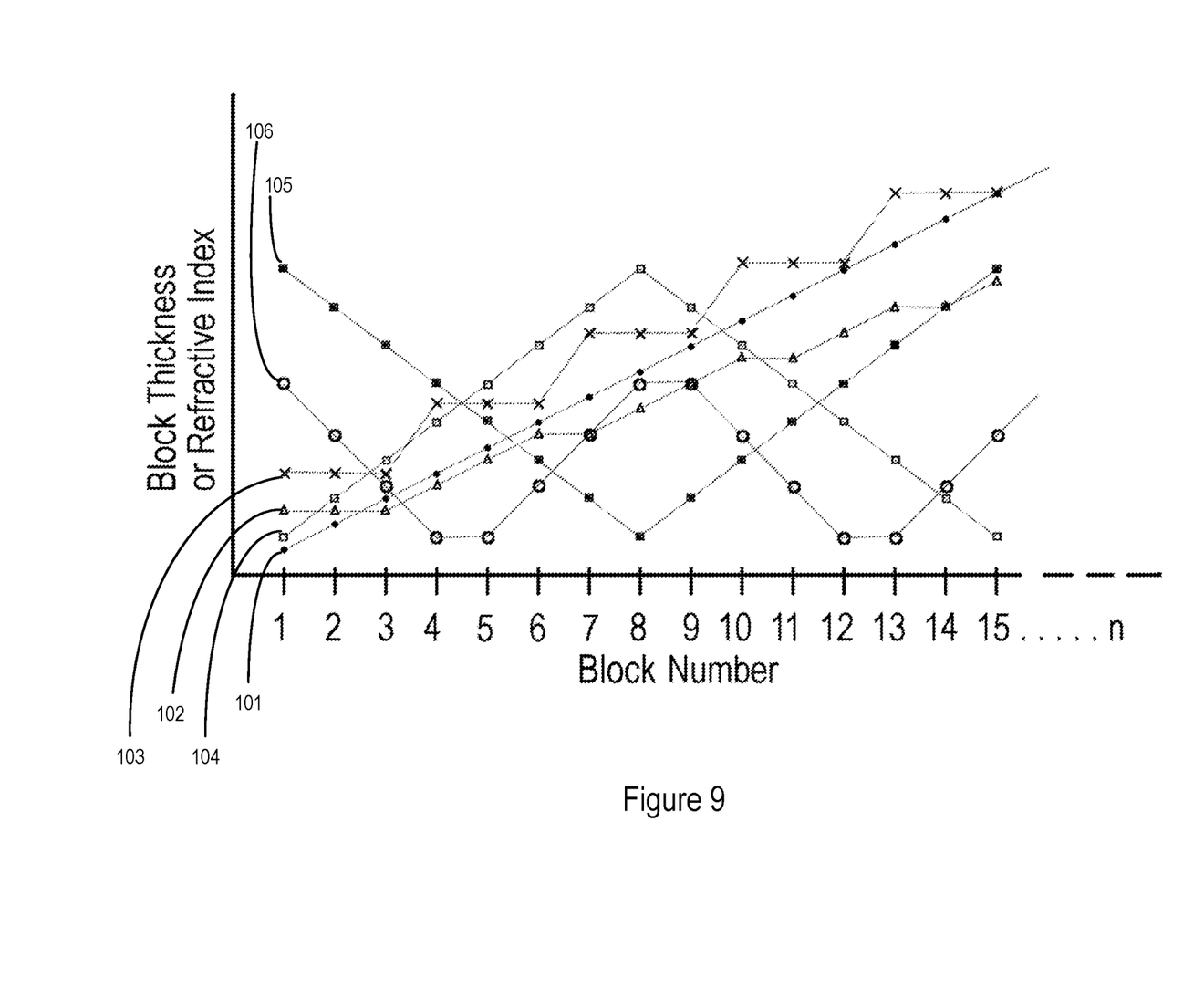
FIG. 9 shows various plots of unit block thicknesses, where the unit blocks are structured alike, but unit block thicknesses differ from one another by scaling factors.

Another embodiment may include a combination of at least two unit-block configurations of plots 101-106 (or other plots). The thicknesses of the unit blocks 14 as potted in FIG. 9 are not an exhaustive list of thickness variations, and the number of schematically depicted unit blocks is kept low for simplicity. Typical thin-film filters 10 will have tens to hundreds of unit blocks 14.

Figure 10:
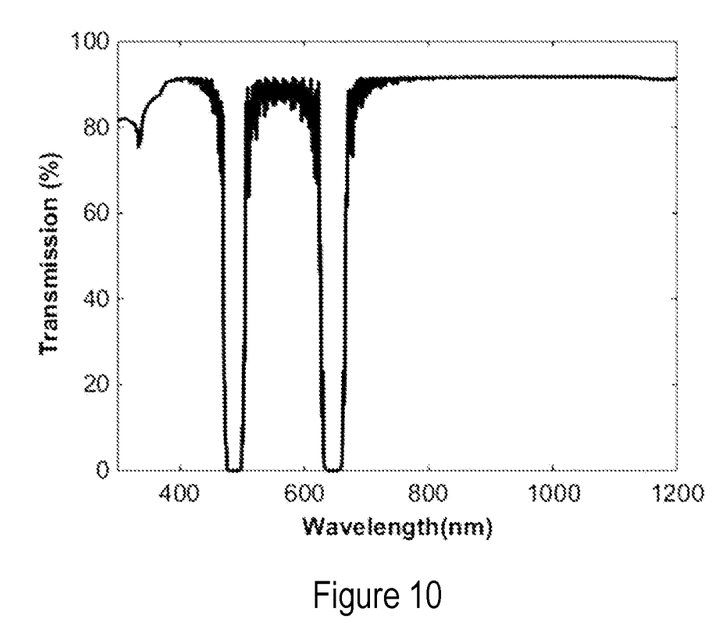
FIG. 10 shows a modeled transmission spectrum of a filter that includes two sets of quarter-wave layer stacks for different wavelengths without an interlayer (or with a transparent interlayer) between them.

For example, FIG. 10 represents the transmission spectrum of a filter that includes two sets of quarter-wave layer stacks 16, each for a different wavelength. In the representative example, each quarter-wave layer stack 16 has 126 bi-layers, where each bi-layer is a unit block of two layers or several bi-layers can form a single unit block, corresponding to 252 layers per multilayer stack 16 composed of Poly Methyl Methacrylate (PMMA) and a second thermoplastic polymer whose refractive index is different from that of PMMA. The layers 18 in one stack 16 have a thickness of approximately 81 nm each, and the layers 18 in the second stack 16 have a thickness of approximately 108 nm each. This arrangement provides a transmission curve with two notches.

The filter 10 used for the transmission spectrum in FIG. 10 has a 0.025-mm thick intermediate layer 22 of PMMA between the two stacks 16 and one 0.025-mm thick layer of PMMA on either side of the device as protective jacket layers 12. The total thickness of this double notch filter 10 is approximately 0.122 mm. The transmission curve of this device provides a blocking in excess of 99.9% of two ranges of wavelength around 488 nm and 647 nm over a blocking bandwidth of about 30 nm to 40 nm and a transition slope smaller than 3% as defined above.

If the number of bi-layers in each stack 16 is reduced to 36, the resulting filter would still be able to block up to 99% of the same wavelength ranges. By co-drawing the filter layers, however, a multitude of bi-layers can be produced without requiring expensive coating processes.

Figure 11:
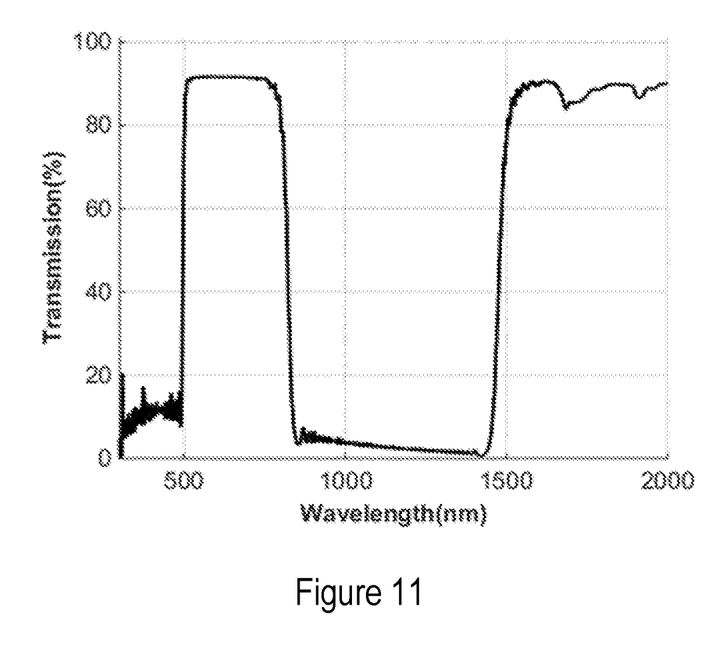
FIG. 11 shows a modeled transmission spectrum of a filter that constitutes a bandpass filter.

FIG. 11 discloses a further example of a filter that constitutes a bandpass filter. The shown example is a transmission spectrum of a filter with a total of 580 bi-layers of the same polymeric materials as mentioned in the example above, with individual layer thicknesses varying in the range between 138 nm and 243 nm, and 0.025-mm-thick outside protective jacket layers. This filter has a total thickness of approximately 0.27 mm.

Selective bands of high and low transmission including the bands disclosed in the above-described examples, can be created by stacking much thicker sheets than the final layers 18 and optionally 12 and 22, but of the same relative thickness proportions as the final layers, in a pre-form that is subsequently drawn through a furnace, possibly repeatedly, to be stretched in the longitudinal direction until the layer thicknesses are reduced so far that they have reached the desired dimensions, while maintaining their thickness proportions.

In a further example, the periodicity of the unit blocks 14 with the scaling factor variations as mentioned above can be interrupted with at least one defect layer made of at least one of the constituent materials or a different material in such a way that the thickness of the at least one defect layer does not follow the periodic pattern of the unit blocks 14 of the rest of the multi-layer stack 16. This arrangement creates a Fabry Perot resonance cavity producing a very narrow band of high transmission.

FIG. 12 shows a representative example of a transmission spectrum of a filter 10 with a total of 1800 layers composed of unit blocks 14 with average layer thicknesses in each unit block 14 varying in the range 64 nm to 114 nm. A defect layer 22 that is 178 nm thick interrupts the periodicity of the layer thicknesses provides an optical transmission curve representing a narrow bandpass filter. The filter used of the example of FIG. 12 has protective jacket layers of 0.025 mm thickness on either side of the filter with a total filter thickness of approximately 0.21 mm.

Final FIG. 13 shows the transmission spectrum of a filter with three defect layers 22 of different thicknesses interrupting the layer periodicity three times. The filter used for FIG. 13 has similar protective jacket layers 12 of 0.025 mm thickness on both sides of the filter with a total filter thickness approximately 0.211 mm.

As an alternative to PMMA, Polycarbonate can be used as the major matrix polymer in conjunction with other thermoplastic polymers with different refractive indices than that of Polycarbonate. Chalcogenide glass materials containing various ratios of Arsenide, Sulfur, Selenide or Germanium demonstrate thermal and mechanical properties compatible with those of certain thermoplastics such as Polycarbonate, Polyetherimide and Polyethersulfone. Ultra-thin flexible filters can be made of alternating layers of at least one polymer and at least one such glassy material.

While the above description constitutes the preferred embodiments of the present invention, it will be appreciated that the invention is susceptible to modification, variation and change without departing from the proper scope and fair meaning of the accompanying claims.

The invention claimed is:
1. A thin-film interference filter comprising:
   a first thin-film interference multi-layer stack composed of individual thin-film layers arranged in groups to form a plurality of first repeat unit blocks;
   a second thin-film interference multi-layer stack composed of individual thin-film layers arranged in groups to form a plurality of second repeat unit blocks; and
   at least one interlayer between the first thin-film interference multi-layer stack and the second thin-film interference multi-layer stack,
   wherein the second thin-film interference multi-layer stack has a different optical transmission spectrum than the first thin-film interference multi-layer stack,
   wherein the at least one interlayer has a thickness that is 10-1000 times thicker than that of each individual thin-film layer in the first thin-film interference multi-layer stack,
   wherein the thin-film interference filter is flexible enough to be bendable to a radius of curvature of 250 mm or less without permanently damaging, deforming or cracking the thin-film interference filter as a whole, or the thin-film layers in the at least one multi-layer stack, and
   wherein the total thickness of the thin-film interference filter is within the range of 0.05 mm to 1 mm.
2. The thin-film interference filter of claim 1, wherein at least one of the at least one interlayer is an absorptive interlayer blocking a range of wavelengths of infrared, visible, or ultraviolet light.

3. The thin-film interference filter of claim 1, comprising:
a first jacket layer and a second jacket layer, between which the first thin-film interference multi-layer stack is arranged.

4. The thin-film interference filter of claim 3, further comprising:
1 to 15 layers of anti-reflective thin-film layers on an outside surface of at least one of the first or the second jacket layer.

5. The thin-film interference filter of claim 4, wherein the 1 to 15 layers of anti-reflective thin-film layers are polymeric or glass-based.

6. The thin-film interference filter of claim 4, wherein the 1 to 15 layers of anti-reflective thin-film layers produced by co-drawing with the first jacket layer and the first thin-film interference multi-layer stack in a thermal drawing process.

7. The thin-film interference filter of claim 4, wherein the 1 to 15 layers of anti-reflective thin-film layers produced by coating the first jacket layer after a thermal drawing process.

8. The thin-film interference filter of claim 3, wherein each of the first jacket layer and the second jacket layer have a thickness of 10-1000 times thicker than each individual thin-film layer in the first thin-film interference multi-layer stack.

9. The thin-film interference filter of claim 3, wherein at least one of the first jacket layer or the second jacket layer is an absorptive layer blocking a range of wavelengths of infrared, visible, or ultraviolet light.

10. The thin-film interference filter of claim 1, wherein each individual thin-film layer in the first multi-layer stack has a thickness in the range of 5 nm to 5,000 nm.

11. The thin-film interference filter of claim 1, wherein the thin-film interference filter has a transmission spectrum varying between a low transmission of at most 20% of incident light of a first wavelength and a high transmission of at least 80% of incident light of a second wavelength.

12. The thin-film interference filter of claim 11, wherein the transmission spectrum has at least one transition edge between the low transmission and the high transmission, wherein the transition edge has a width of at most 5% of a third wavelength between the first and the second wavelength, at which the thin-film interference filter transmits 50% of incident light.

13. The thin-film interference filter of claim 1, wherein the thin-film interference filter has a transmission spectrum with at least one transition edge between a high transmission of at least 50% of incident light of a first wavelength and a low transmission of at most 20% of incident light of a second wavelength, wherein the transition edge has a width of at most 5% of the first wavelength, at which the thin-film interference filter transmits 50% of a maximum transmission adjacent the transition edge.

14. The thin-film interference filter of claim 1, further comprising:
at least one defect layer of a different optical thickness than immediate neighboring individual thin-film layers forming the repeat unit blocks.

15. The thin-film interference filter of claim 1, wherein at least two of the individual thin-film layers within each of the first repeat unit blocks differ in at least one of a thickness and a refractive index for a specific wavelength.

16. The thin-film interference filter of claim 15, wherein at least two of the individual thin-film layers differ in optical thickness for the specific wavelength defined as a product of the thickness multiplied by the refractive index.

17. The thin-film interference filter of claim 15, wherein the subsequent individual thin-film layers vary in optical thickness or refractive index from each other by small incremental steps to form a quasi-rugate filter with refractive indices of the subsequent thin-film layers following a discrete sinusoidal form.

18. The thin-film interference filter of claim 1, wherein the individual thin-film layers of at least two of the repeat unit blocks are arranged in identical orders of refractive indices.

19. The thin-film interference filter of claim 15, wherein the individual thin-film layers of at least two of the unit blocks are arranged in identical orders of thicknesses, wherein each of the individual thin-film layers of one unit block has a thickness differing from a respective individual thin-film layer of another unit block by a constant scaling factor such that the one unit block differs from the other unit block by the constant scaling factor.

20. A thin-film interference filter comprising a first thin-film interference multi-layer stack composed of individual thin-film layers arranged in groups to form a plurality of first repeat unit blocks,
wherein the individual thin-film layers of at least two of the repeat unit blocks are arranged in identical orders of refractive indices,
wherein the individual thin-film layers of at least two of the unit blocks are arranged in identical orders of thicknesses,
wherein each of the individual thin-film layers of one unit block has a thickness differing from a respective individual thin-film layer of another unit block by a constant scaling factor such that the one unit block differs from the other unit block by the constant scaling factor,
wherein the thin-film interference filter is flexible enough to be bendable to a radius of curvature of 250 mm or less without permanently damaging, deforming or cracking the thin-film interference filter as a whole, or the thin-film layers in the at least one multi-layer stack, and
wherein the total thickness of the thin-film interference filter is within the range of 0.05 mm to 1 mm.

21. The thin-film interference filter of claim 20, wherein the thin-film interference filter has a transmission spectrum varying between a low transmission of at most 20% of incident light of a first wavelength and a high transmission of at least 80% of incident light of a second wavelength,
wherein the transmission spectrum has at least one transition edge between the low transmission and the high transmission, and
wherein the transition edge has a width of at most 5% of a third wavelength between the first and the second wavelength, at which the thin-film interference filter transmits 50% of incident light.

22. The thin-film interference filter of claim 20, further comprising:
a first jacket layer and a second jacket layer, between which the first thin-film interference multi-layer stack is arranged; and
1 to 15 layers of anti-reflective thin-film layers on an outside surface of at least one of the first or the second jacket layer.

* * * * *